UNITED STATES PATENT OFFICE.

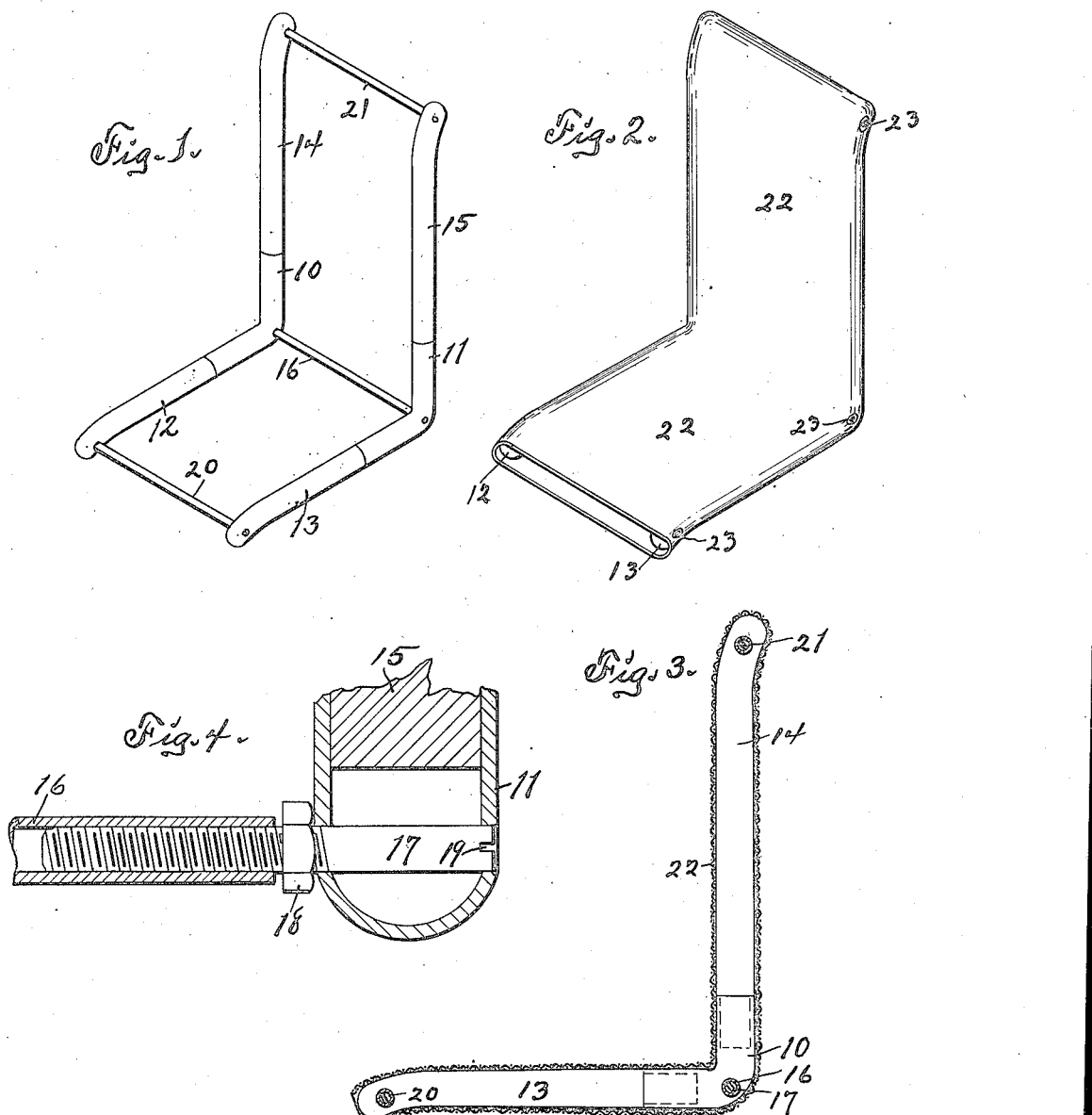

DAVID BENSON AND GEORGE K. BRUCE, OF DES MOINES, IOWA.

VENTILATED AUTOMOBILE DRIVER'S SEAT.

1,422,915. Specification of Letters Patent. Patented July 18, 1922.

Application filed October 26, 1920. Serial No. 419,595.

*To all whom it may concern:*

Be it known that we, DAVID BENSON and GEORGE K. BRUCE, each, a citizen of the United States of America, and resident of Des Moines, Polk County, Iowa, have invented a new and useful Ventilated Automobile Driver's Seat, of which the following is a specification.

The object of this invention is to provide improved means for stretching a tubular cover on a frame to form a seat adapted to be removably and replaceably mounted on a vehicle.

A further object of this invention is to provide an improved construction for a seat frame.

Our invention consists in the construction, arrangement and combination of elements hereinafter set forth, pointed out in the claim and illustrated by the accompanying drawing, in which—

Figure 1 is a perspective of a seat-frame embodying our improvements. Figure 2 is a perspective of the complete seat. Figure 3 is a vertical section of the seat. Figure 4 is a detail vertical section, on an enlarged scale showing the stretching means.

In the construction of the device as shown the numerals 10, 11 designate substantially counterpart corner members, each constructed of a single piece of metal by molding and tubular in form and also having a right-angled bend near its center. Seat bars 12, 13, preferably made of wood, are formed with reduced end portions (dotted lines in Fig. 3) fitted within forward end portions of the corner members 10, 11 and outer end portions of said bars are bent downward slightly. Back bars 14, 15, preferably made of wood, are formed with reduced end portions (dotted lines in Figure 3) fitted within upper end portions of the corner members 10, 11 and upper end portions of said bars are bent rearward slightly. A tubular rod 16 extends at one end within the corner member 10 and a bolt 17 is screwed into the other end of said rod and extends through the corner member 11, there being a nut 18 screwed on the bolt between the member 11 and the adjacent end of the rod. A slot 19 is formed in the outer end of the bolt 17 whereby a screw-driver may be employed to turn the bolt. The rod 16, bolt 17 and nut 18 constitute a connecting and stretching device between the corner members 10, 11. Similar connecting and stretching devices, indicated generally by the numerals 20, 21 connect the outer ends of the seat bars 12, 13 and the upper ends of the back bars 14, 15. In each instance one end of the connecting and stretching device extends within a side member and the other end extends through and pivots in the opposite side member. A tubular cover 22, preferably of fabric, is mounted on and encloses the connected frame, and one end of said cover is open to facilitate introduction and removal of the frame and to provide ventilation within the cover. The cover 22 is provided with holes 23, three in number, registering with the slotted ends of the bolts to permit a screw-driver to engage in the slots of the bolts. Through the use of a screw-driver the bolts may be rotated to expand or contract the frame, particularly for the purpose of stretching the cover laterally.

The complete seat is adapted to be employed supplemental to and upon a cushion or primary seat of a motor car and in such use the vibration of the cover 22 by movements of the user flexes the fabric in a manner similar to bellows and causes air to pass through the fabric and also establishes various currents of air through the fabric tube, to the end of thoroughly ventilating the tube and preventing the accumulation of perspiration due to intimate association with the buttocks and shoulders of the user.

We claim as our invention—

In a ventilated automobile-driver's seat having a frame formed of side members and adjustable connecting means, each connecting means comprising a tube entering one side member laterally, a bolt screwed in said tube and extending through the other side member laterally, and a nut on said bolt between the latter side member and the adjacent end of the tube, said frame being adapted to support a fabric cover in embracing relation thereon, said cover being adapted to be stretched laterally by said connecting means.

Signed at Des Moines, in the county of Polk and State of Iowa, this 28th day of September, 1920.

DAVID BENSON.
GEO. K. BRUCE.